(12) United States Patent
Sonnier

(10) Patent No.: US 8,171,963 B2
(45) Date of Patent: May 8, 2012

(54) APPARATUS FOR EXTRACTING, MEASURING AND TRANSFERRING FLUIDS

(76) Inventor: Troy Sonnier, Carencro, LA (US)

( * ) Notice: Subject to any disclaimer, the term of this patent is extended or adjusted under 35 U.S.C. 154(b) by 1093 days.

(21) Appl. No.: 12/008,506

(22) Filed: Jan. 11, 2008

(65) Prior Publication Data

US 2009/0178725 A1 Jul. 16, 2009

(51) Int. Cl.
*B65B 1/04* (2006.01)
(52) U.S. Cl. .............. 141/27; 141/25; 141/26; 141/326; 141/347
(58) Field of Classification Search .............. 141/23, 141/25–27, 301, 319, 325, 326, 346, 347; 215/267, 311; 604/407
See application file for complete search history.

(56) References Cited

U.S. PATENT DOCUMENTS

| | | | |
|---|---|---|---|
| 2,096,461 A | 10/1937 | Mane et al. | |
| 2,129,144 A | 9/1938 | Lancaster | |
| 3,266,532 A | 8/1966 | Stewart | |
| 3,873,274 A * | 3/1975 | Neisius | 422/75 |
| 3,885,562 A * | 5/1975 | Lampkin | 604/189 |
| 3,995,667 A * | 12/1976 | Brandt | 141/18 |
| 4,081,111 A | 3/1978 | Sandow | |
| 4,175,597 A | 11/1979 | Peterson | |
| 4,230,112 A * | 10/1980 | Smith | 604/403 |
| 4,273,257 A | 6/1981 | Smith et al. | |
| 4,327,782 A | 5/1982 | McKibben et al. | |
| 5,598,939 A * | 2/1997 | Watson et al. | 215/307 |
| 5,746,349 A | 5/1998 | Putteman | |
| 6,112,779 A | 9/2000 | Camilla | |
| H2044 H | 9/2002 | Faughey et al. | |
| 6,499,617 B1 * | 12/2002 | Niedospial et al. | 215/320 |

* cited by examiner

*Primary Examiner* — Timothy L Maust
(74) *Attorney, Agent, or Firm* — Ted M. Anthony

(57) ABSTRACT

An extraction device for extracting fluid from a container that permits precise measurement and transfer of such fluid. A cap having a valve assembly is attached to a container holding fluid. The extraction device can be connected to the cap thereby opening the valve assembly. Fluid can be extracted from the container and measured in the extraction device. The container is automatically sealed upon removal of the extraction device from the cap.

3 Claims, 3 Drawing Sheets

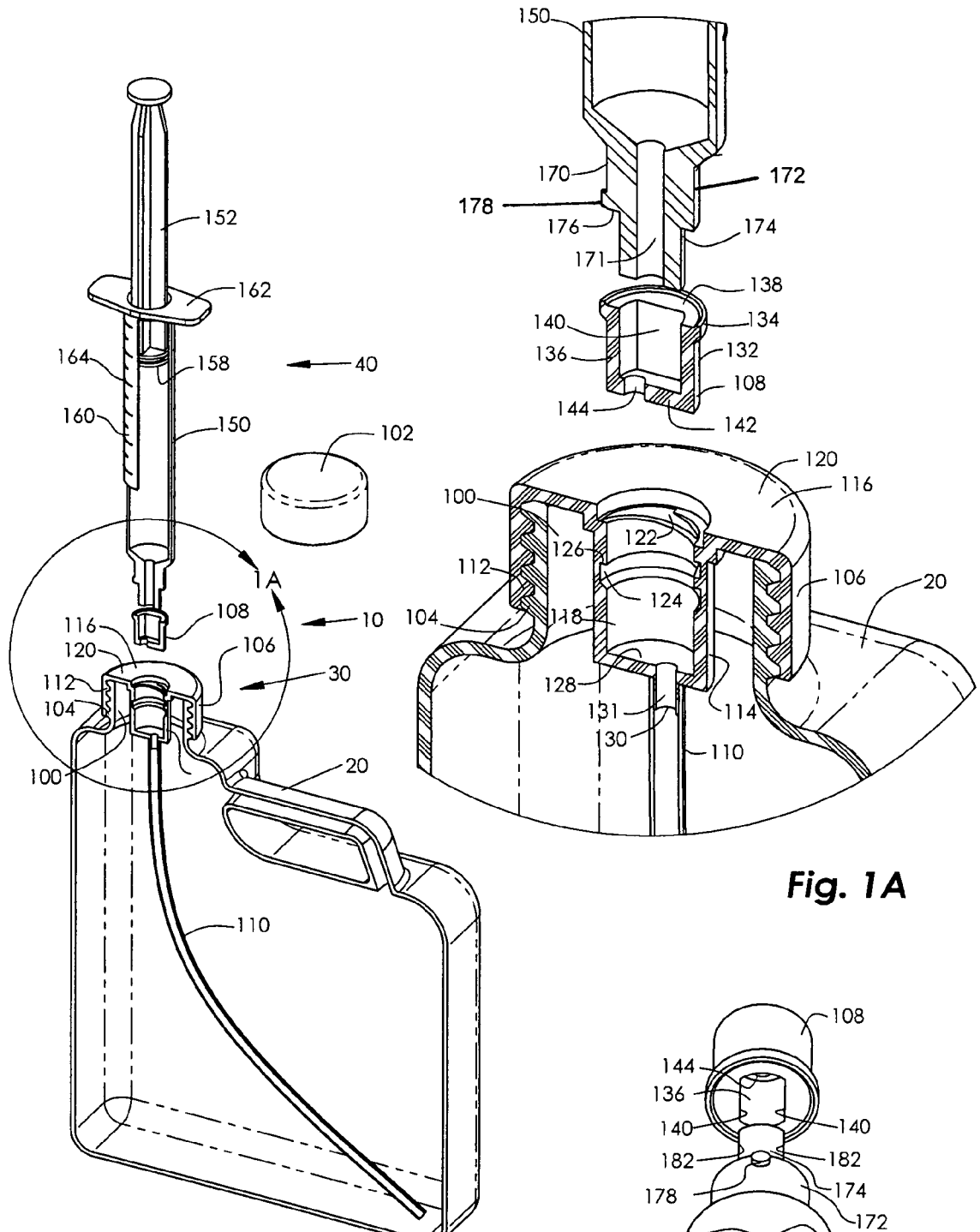
Fig. 1A
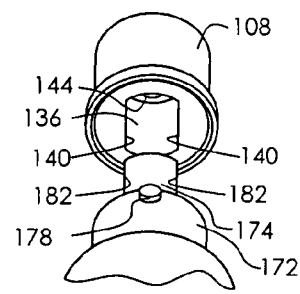
Fig. 1
Fig. 1B

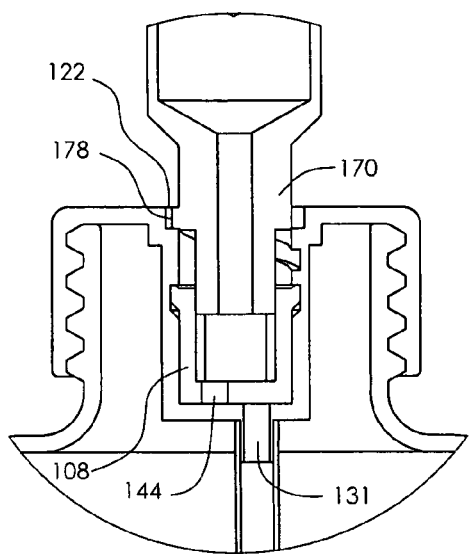
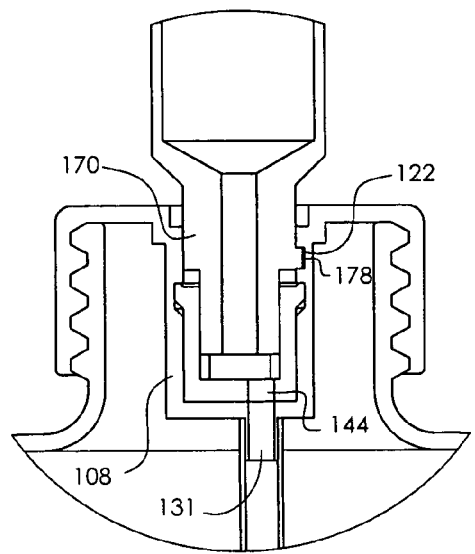
Fig. 2A
Fig. 3A
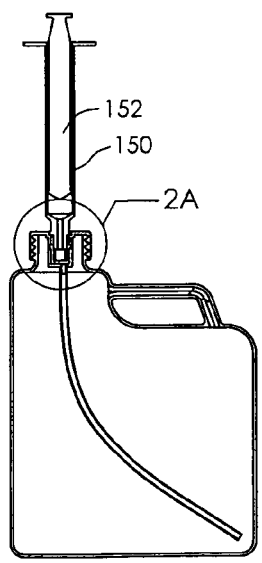
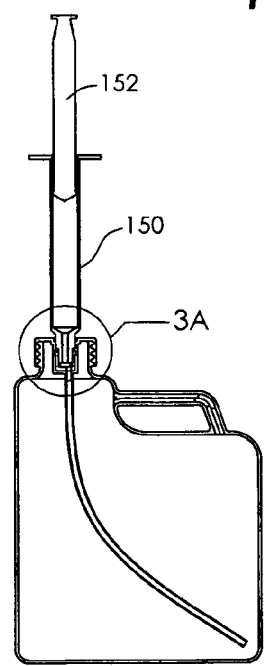
Fig. 2
Fig. 3

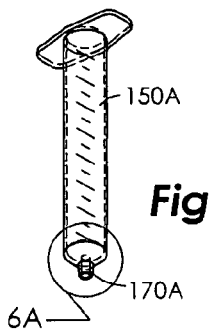
Fig. 5
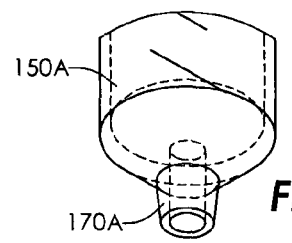
Fig. 5A
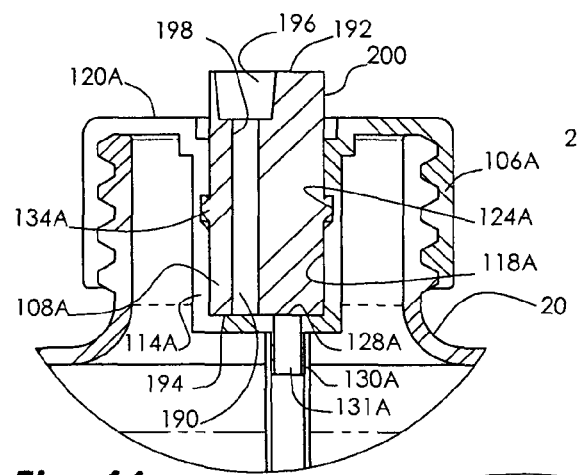
Fig. 4A
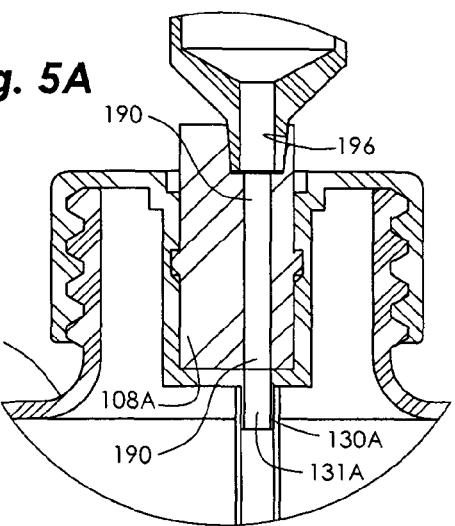
Fig. 6A
Fig. 4B
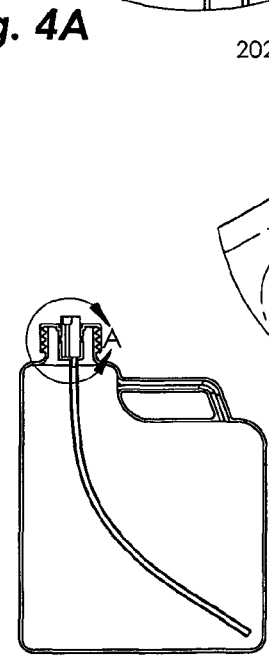
Fig. 4
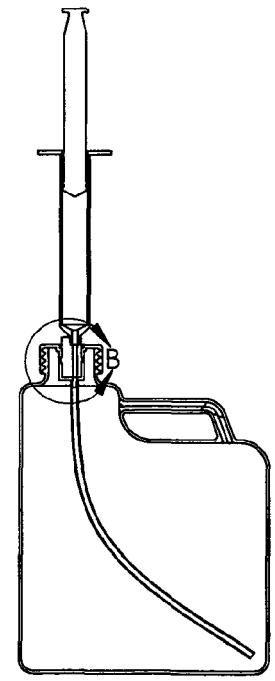
Fig. 6

APPARATUS FOR EXTRACTING, MEASURING AND TRANSFERRING FLUIDS

BACKGROUND OF THE INVENTION

1. Field of the Invention

The present invention relates to an apparatus for extracting, measuring and/or transferring liquid from a container. More particularly, the present invention pertains to an apparatus for extracting liquid from a sealed container that allows such liquid to be measured as it is being extracted, and such container to be resealed following extraction of the desired volume of liquid.

2. Description of the Related Art

It is often desirable to transfer a measured volume of liquid from a container to another location (such as, for example, another container). By way of illustration, but not limitation, one such common application involves the dilution of concentrated insecticides, pesticides, or cleaning chemicals. In such application, a desired volume of concentrated liquid is generally extracted from a storage container and transferred to a separate container in which such concentrated liquid can be mixed with water or other diluting agent.

One common means of transferring liquid for this purpose is to pour such liquid from a storage container directly into a measuring receptacle, such as a beaker or measuring cup. Once a desired amount of liquid is poured into the measuring receptacle, it is then poured into a separate container where it can be diluted. This method is often imprecise and frequently results in spillage of the liquid during the pouring process. Further, if the liquid at issue is volatile, vapor(s) from such liquid may escape during the pouring process, thereby exposing personnel to health and safety hazards resulting from contact with such vapor(s). Additionally, removable container caps can often be lost or misplaced during this process.

When pouring liquid directly from a storage container into a measuring receptacle, liquid can frequently overflow or gush out of the storage container unexpectedly. When this occurs, such liquid can splash out of such measuring receptacle, or miss such receptacle entirely, thereby resulting in unwanted spillage of such liquid. The liquid can also leak or drip along outer surface(s) of the storage container, measuring receptacle, or both. In extreme cases, uncontrolled liquid flow can even cause a measuring receptacle to overturn, thereby resulting in spillage of significant volumes of liquid.

In some cases, a liquid being poured from a storage container exits such container in surges as air pressure within said container changes. Various attempts have been made to correct this common problem, including the use of at least one sealable air inlet vent in the container. Such air vents can improve air surging problems, but typically give rise to different problems. Specifically, liquids can frequently leak through such air vents, while the removable cover or lid to such sealable air vents can often be lost or misplaced.

Prior art devices have been developed to permit extraction of liquid from storage containers without requiring such liquid to be poured from such containers. However, such devices are typically designed for specialized applications and are too complicated and costly to be economically feasible for everyday industrial, commercial or household applications. Additionally, liquid extracted from storage containers using such existing extraction devices typically cannot be accurately measured during the extraction process.

SUMMARY OF THE INVENTION

The apparatus of the present invention efficiently and economically overcomes the problems associated with existing prior art devices and methods associated with the extraction and measuring of liquids from containers. In the preferred embodiment, the present invention comprises an extraction and measuring assembly, as well as an adapter cap assembly. The adapter cap assembly is installed on said container and can be used in place of the original cap supplied with said container. In the preferred embodiment, the adapter cap assembly remains installed on said container even during periods when contents of a container are not being extracted (such as, for example, when such contents are being stored in such container until needed later).

The adapter cap assembly of the present invention generally has the same basic size and shape as a standard threaded container cap. Said adapter cap assembly further includes a substantially vertical and cylindrical recess extending from the upper surface of the adapter cap into the body of said cap, and terminating in a substantially flat lower surface having a bore. Said bore is offset from the center of said recess, and extends through said lower surface. A tubular boss, aligned with the bore in said flat lower surface, extends downward from said flat lower surface of said adapter cap. In the preferred embodiment, a siphon tube is connected to said boss and extends into the inner chamber of the container.

A helical groove is disposed along the inner surface of said substantially cylindrical recess. Said helical groove opens at the upper surface of said substantially cylindrical recess and spirals downward through approximately 180 degrees. A horizontal retainer groove is disposed below the base of said helical groove. In the preferred embodiment, said horizontal retainer groove is situated at approximately half way down the depth of said substantially cylindrical recess.

A substantially cylindrical rotary valve is rotatably disposed within said substantially cylindrical recess of said adapter cap. Said rotary valve is biased against the bottom surface of said substantially cylindrical recess by an elastomeric biasing lip that is received within the retainer groove disposed along the inner surface of said substantially cylindrical recess. Said rotary valve has an elongated recess with at least one flat side; said elongated recess extends from the upper surface of the rotary valve through substantially the entire length of said valve. When said rotary valve is in an open position, a vertical, eccentric bore permits communication between the bottom surface of the elongated recess of said valve and the opening in said tubular boss. Rotation of said rotary valve results in the opening of the tubular boss being covered and, therefore, sealingly closed.

The extraction and measuring assembly of the present invention is similar to a common syringe, but further comprises an extension which snugly engages the cylindrical recess of the adapter cap and the elongated recess of the rotary valve. The engagement boss also includes a radial boss which engages the helical groove disposed along the inner surface of the substantially cylindrical recess of the adapter cap. As such, extension of the extraction and measuring assembly can be inserted into the elongated recess of the rotary valve, while the radial boss engages said helical groove disposed along the inner surface of said substantially cylindrical recess of said adapter cap assembly.

Rotation of the extraction assembly 180 degrees permits said radial boss to travel within said helical groove. In this manner, the extraction assembly travels downward, while the rotating valve rotates to the open position, thereby allowing communication between the extraction and measuring assembly and the contents of the container. The plunger of the syringe-like extraction and measuring assembly can be pulled upward to extract liquid from the container. Graduations on the body of the syringe-like extraction and measuring member allow accurate measurement of liquid extracted from a container. In the preferred embodiment, one side of the body of the syringe-like extraction and measuring member is substantially flat. Said flat surface provides a convenient location to display important information including, without limitation, characters or other indicia.

The apparatus of the present invention provides a simple, efficient, and economical means to extract liquid from containers having a variety of different designs and sizes. Furthermore, the present invention provides a means for extracting liquid from containers wherein such liquid can be easily and accurately measured as it is being extracted.

BRIEF DESCRIPTION OF DRAWINGS

FIG. 1 depicts a perspective sectional view of the apparatus for extracting, measuring and transferring liquids of the present invention.

FIG. 1A depicts a detailed view of a portion of FIG. 1.

FIG. 1B depicts a perspective view of the distal end of the extraction and measuring device, and rotary valve of the present invention.

FIG. 2 depicts a side sectional view of the extraction and measuring device of the present invention with the plunger in a substantially inserted position.

FIG. 2A depicts a detailed view of a portion of FIG. 2.

FIG. 3 depicts a side view of the extraction and measuring device of the present invention with the plunger in a withdrawn position.

FIG. 3A depicts a detailed view of a portion of FIG. 3.

FIG. 4 depicts a side sectional view of a portion of the extraction and measuring device of the present invention installed on a liquid storage container.

FIG. 4A depicts a detailed view of a portion of FIG. 4.

FIG. 4B depicts a perspective sectional view of the device depicted in FIG. 4A.

FIG. 5 depicts a perspective view of a cylinder body of the extraction and measuring assembly of the present invention.

FIG. 5A depicts a detailed view of one end of the cylinder body of the extraction and measuring assembly of the present invention.

FIG. 6 depicts a side sectional view of the extraction and measuring device of the present invention with a plunger in a substantially withdrawn position.

FIG. 6A depicts a detailed view of a portion of FIG. 6.

DETAILED DESCRIPTION OF A PREFERRED EMBODIMENT

Referring to the drawings, FIG. 1 depicts a perspective sectional view of extraction and measuring apparatus 10 of the present invention, as well as liquid storage container 20. Container 20 may be any of several commonly available liquid storage containers, such as those used to distribute concentrated chemicals, including, without limitation, insecticides, herbicides, cleaners, and similar materials. Liquid storage container 20 has upper opening 100 that extends into an internal void formed within container 20. Cap 102 can be used to seal upper opening 100. Upper opening 100 has external threads 104 about its outer surface, such that cap 102 may be threadably and sealably attached to container 20 to cover upper opening 100. Cap 102, which is typically provided with storage container 20, can be removed and replaced by as described in detail below.

Extraction and measuring apparatus 10 comprises adapter cap assembly 30 and extraction assembly 40. Adapter cap assembly 30 comprises adapter cap 106, rotary valve 108, and siphon tube 110. In the preferred embodiment, adapter cap 106 is substantially cylindrical and has attachment threads 112 which are compatible with container threads 104, such that adapter cap 106 may be threadably and sealably attached to upper opening 100 of container 20 in the same manner as, and in place of, cap 102.

Adapter cap 106 further comprises substantially cylindrical recess 114 which opens to upper surface 120 of adapter cap 106, and has a base formed by substantially flat, smooth bottom surface 128. In the preferred embodiment, cylindrical recess 114 is concentric to adapter cap 106 and extends downward from upper surface 120 of adapter cap 106; as such, when adapter cap 106 is attached to container 20 over upper opening 100 of container 20, cylindrical recess 114 is disposed within upper opening 100 of container 20. Cylindrical recess 114 also has substantially smooth inside surface 118. Inside surface 118 has helical groove 122 which is open to upper surface 120 of adapter cap 106 and spirals along inside surface 118 through approximately 180 degrees.

Inside surface 118 also has radial retainer groove 124 disposed along said inside surface 118 of substantially cylindrical recess 114. In the preferred embodiment, radial retainer groove 124 is positioned such that upper edge 126 of retainer groove 124 is disposed slightly below the lower termination of point helical groove 122. Bottom surface 128 of cylindrical recess 114 further includes tubular boss 130 extending vertically downward from said bottom surface 128. Boss 130 has axial through-bore 131. In the preferred embodiment, boss 130 is horizontally offset relative to the center point of cylindrical recess 114; that is, boss 130 and cylindrical recess 114 are not coaxial. Siphon tube 110 connects to boss 130 and extends within the inner void of container 20, toward the base of container 20.

Referring to FIG. 1A, rotary valve 108 is substantially cylindrical, having outside diameter 132 which is slightly less than the inside diameter of substantially cylindrical recess 114. Rotary valve 108 is preferably constructed of a pliable material, such as natural or synthetic rubber or similar elastomeric compound. Rotary valve 108 beneficially fits rotatably within substantially cylindrical recess 114 and forms a liquid-seal against inside surface 118 of said cylindrical recess 114. Rotary valve 108 also has biasing lip 134 at its upper circumferential edge. The outside diameter of biasing lip 134 is ideally slightly larger than outside diameter 132 of rotary valve 108. Rotary valve 108 is disposed within cylindrical recess 114, such that biasing lip 134 of rotary valve 108 is disposed within retainer groove 124, which is itself disposed along inside surface 118 of substantially cylindrical recess 114. The length of rotary valve 108 is beneficially sized so that when rotary valve 108 is disposed against bottom surface 128 of cylindrical recess 114. In the preferred embodiment, biasing lip 134 should be deformed slightly downward in order to fit within retainer groove 124; as such, rotary valve 108 is biased downward against bottom surface 128 of cylindrical recess 114 by the elastomeric properties of biasing lip 134.

Rotary valve 108 also has elongate recess 136 extending downward from upper surface 138 of rotary valve 108 and terminating in substantially flat bottom surface 142. In the preferred embodiment, elongate recess 136 has flat side 140 (best seen in FIG. 1B). Substantially flat bottom surface 142 of recess 136 of rotary valve 108 has bore 144, which is horizontally offset from the center point of recess 114 by substantially the same distance that the longitudinal axis of boss 130 is horizontally offset from the center point of cylindrical recess 114 in adapter cap 106.

Referring to FIG. 1, extraction assembly 40 comprises cylinder 150 and plunger 152. Plunger 152 includes piston seal element 158 at its lower end. Extraction cylinder 150 comprises substantially cylindrical barrel 160, measuring graduation markings 164, and substantially horizontal finger plates 162. Plunger 152 is slidably disposed within barrel 160 of cylinder 150 such that piston seal element 158 forms a pressure seal against the inner surface of barrel 160 of cylinder 150. Barrel 160 of cylinder 150 has measuring graduations 164 which reflect the volume of liquid within barrel 160 of cylinder 150 as plunger 152 translates within barrel 160 of cylinder 150. By way of illustration, but not limitation, barrel 160 of cylinder 150, plunger 152, and graduations 164 are similar in many ways to syringes commonly used for hypodermic injections. In the preferred embodiment, one side of the barrel 160 defines a substantially flat surface. Said flat surface provides a convenient location to display important information including, without limitation, identification characters, artwork or other indicia.

Referring to FIG. 1A, cylinder 150 also comprises end extension 170, having through-hole 171. End extension 170 has first diameter 172 and second diameter 174, where first diameter 172 is adjacent to barrel 160 and is greater than second diameter 174. First diameter 172 and second diameter 174 are concentric to cylinder 150. As such, shoulder 176 is formed at the transition between first diameter 172 and second diameter 174. Referring to FIG. 1B, radial boss 178 extends radially outward from first diameter 172 of end extension 170 and is disposed slightly above shoulder 176. First diameter 172 fits slidably and rotationally within inside surface 118 of cylindrical recess 114, while radial boss 178 fits slidably within helical groove 122 disposed along inside surface 118 of cylindrical recess 114.

Still referring to FIG. 1B, second diameter 174 of end extension 170 has at least one flat surface 182. Second diameter 174 fits slidably, but snugly, within elongated recess 136 of rotary valve 108, while flat surface 182 of second diameter 174 of end extension 170 can engage against substantially flat side 140 of rotary valve 108.

Referring to FIG. 2 and FIG. 2A, plunger 152 is disposed within barrel 160 of cylinder 150. A first rotary position of rotary valve 108 is illustrated in FIG. 2, and in more detail in FIG. 2A, wherein bore 144 of rotary valve 108 is offset from the center point of cylindrical recess 114, while through-hole 131 of tubing boss 130 is similarly offset from the center point of substantially cylindrical recess 114. In this position, bore 144 is not aligned with bore 131. As set forth above, rotary valve 108 is biased against bottom surface 128 of cylindrical recess 114, rotary valve 108 is preferably constructed of a pliable material, and bottom surface 128 of cylindrical recess 114 is substantially flat and smooth. As such, rotary valve 108 seals against bottom surface 128 of cylindrical recess 114. In such first rotary position of rotary valve 108, through-hole 131 of tubing boss 130 is not in fluid communication with elongated recess 136. That is, in such first rotary position of rotary valve 108, any liquid contained within container 20 is sealed from the atmosphere and cannot pass through adapter cap assembly 30.

Referring to FIG. 2A, second diameter 174 of end extension 170 of cylinder 150 engages elongated recess 136 of rotary valve 108 while radial boss 178 of end extension 170 is near, but is not engaged within, helical groove 122 disposed along inside surface 118 of cylindrical recess 114. That is, when rotary valve 108 is in said position, extraction assembly 40 can be inserted into adapter assembly 30 until radial boss 178 of end extension 170 engages helical groove 122.

FIG. 3 and FIG. 3A generally depict similar views as FIG. 2 and FIG. 2A, respectively. However, in FIG. 3, plunger 152 is retracted from barrel 160 of cylinder 150. In FIG. 3A, extraction assembly 40 and rotating valve 108 are rotated 180 degrees relative to FIG. 2 and FIG. 2A. Radial boss 178 of end extension 170 is engaged within helical groove 122 that is disposed along inside surface 118 of cylindrical recess 114. As such, when extraction assembly 40 is rotated, radial boss 178, having engaged helical groove 122, directs extraction assembly 40 to travel downward within cylindrical recess 114 of adapter cap 106. Flat surface 182 of second diameter 174 of end extension 170 engages flat surface 140 of elongated recess 136 of rotary valve 108 as shown in FIG. 1B and as described above. As such, rotation of extraction assembly 40 causes corresponding rotation of rotating valve 108. Thus, a second rotary position is defined that is offset 180 degrees from said first rotary position depicted in FIG. 2A and discussed above. In such second rotary position, bore 144 of rotary valve 108 is aligned with through-bore 131 of boss 130. As such, in said second rotary position, liquid contents of container 20 can be extracted via siphon tube 110, through bore 144 of rotating valve 108, and aligned through-bore 171 of end extension 170, and ultimately into barrel 160 of cylinder 150 of extraction assembly 40.

In operation, where it is desired to extract a specific volume of liquid from a container such as liquid storage container 20, "original" container cap 102 is removed. Adapter assembly 30 is sealably attached to upper opening 100 of container 20; in the preferred embodiment, adapter cap 106 of adapter cap assembly 30 attaches to upper opening 100 of container 20 in the same manner as original container cap 102 (in most cases, using connection threads). Adapter cap assembly 30 comprises siphon tube 110 as described above. Thus, in the process of installing and attaching adapter assembly 30, siphon tube 110 is first inserted into container 20 through upper opening 100 thereof.

Rotary valve 108 is initially in first rotary position, that is, through-bore 131 of boss 130 is obstructed by the base of rotary valve 108. Plunger 152 is fully inserted within barrel 160, as depicted in FIG. 2 and FIG. 2A. Extraction assembly 40 is inserted into adapter cap assembly 30 such that end extension 170 (and, more specifically, second diameter 174 of end extension 170) of cylinder 150 engages elongated recess 136 of rotary valve 108 as shown in FIG. 2A as described above.

Extraction assembly 40 is rotated approximately 180 degrees, such that radial boss 178 engages helical groove 122 disposed along inner surface 118 of cylindrical recess 114. As discussed above, second diameter 174 of end extension 170 fits snugly within elongated recess 136, effectively creating a seal between second diameter 174 and the inner surfaces of said elongated recess 136.

As plunger 152 of extraction assembly 40 is pulled upward to a desired level, a desired volume of liquid contents of container 20 is drawn through the aligned bores of siphon tube 110, and rotary valve 108, and into barrel 160 of cylinder 150. Extraction assembly 40 is then rotated back 180 degrees, back to said first rotary position, such that rotary valve 108 again seals through-hole 131 of boss 130, thereby isolating the contents of container 20 from atmosphere.

The volume of liquid extracted from liquid storage container 20 can be measured during said extraction process using measuring graduation markings 164. Further, such liquid can be temporarily maintained within barrel 160 of cylinder 150 until it is transferred to another location (such as, for example, another container or receptacle.)

If container 20 is substantially filled with liquid with only a relatively small volume of air or vapor above such liquid, it may be preferable to begin the sequence described above with plunger 152 in its fully upward position. Under such a scenario, extraction assembly 40 is engaged as described previously. Upon full engagement of extraction assembly, plunger 152 is pushed downward, thereby injecting air into container 20, whereupon plunger 152 can then be pulled upward as described above in order to draw liquid into barrel 160 of cylinder 150.

Alternate Embodiment

An alternative embodiment 50 of the present invention is depicted in FIGS. 4 through 6A. Referencing FIG. 4 and FIG. 4A, in alternative embodiment 50, alternative adapter cap 106A is similar to adapter cap 106, except that inner surface 118A of cylindrical recess 114A of alternate adapter cap 106A does not have a helical groove such as helical groove 122. Instead, inner surface 118A has retainer groove 124A (similar to retainer groove 124 of inner surface 118 of cylindrical recess 114 of adapter cap 106 described above.) Rotary valve 108A of this embodiment is substantially cylindrical and is rotatably disposed within cylindrical recess 114A. Upper surface 192 of alternate rotary valve 108A is situated above top surface 120A of alternate adapter cap 106A, while bottom surface 194 of alternate rotary valve 108A is coincident with bottom surface 128A of inner surface 118A.

Alternate rotary valve 108A has biasing lip 134A, generally corresponding to biasing lip 134 of rotating valve 108 described above. Biasing lip 134A fits into retainer groove 124A along inner surface 118A in the same manner, and essentially performs the same function, as biasing lip 134 of rotary valve 108 of the embodiment described above. As such, alternate rotary valve 108A is biased downward by biasing lip 134A in the same manner that rotary valve 108 is biased downward by biasing lip 134.

Alternate rotary valve 108A does not have an elongated recess corresponding to elongated recess 136 of rotary valve 108. Instead, alternate rotary valve 108A has upper boss 200 which substantially matches the length of alternate rotary valve 108A between upper surface 192 and biasing lip 134A. Upper boss 200 has vertical, parallel flat sides 202 (best seen in FIG. 4B) symmetrically disposed about the central vertical plane of alternate rotary valve 108A. Flat sides 202, and the distance by which upper surface 192 is disposed above upper surface 120A of adapter cap 106A, are designed to permit a user's fingers to grasp and rotate alternate rotary valve 108A. Alternate rotary valve 108A also has channel 190 extending from upper surface 192 to bottom surface 194 of alternate rotary valve 108A. Channel 190 of alternate rotary valve 108A and through-hole 131A of boss 130A are offset from the center point of adapter cap 106A by substantially the same distance. Channel 190 of alternate rotary valve 108A has nominal diameter 198 and taper 196, such that the diameter of channel 190 of alternate rotary valve 108A is largest at upper surface 192 of alternate rotary valve 108A and decreases to nominal diameter 196 at some small distance below upper surface 196.

FIG. 5 and FIG. 5A depict alternate extraction cylinder 150A which has alternate end extension 170A. Alternate end extension 170A is tapered, so that alternate engagement boss 170A fits snugly into taper 196 of channel 190 of alternate rotary valve 108A.

Referring to FIG. 4A and FIG. 6A, alternate rotary valve 108A has first and second rotary positions, generally corresponding to first and second rotary positions of rotary valve 108 of the preferred embodiment described above. In such second rotary position (FIG. 6A), channel 190 of rotary valve 108A is coaxial to through-hole 131A of boss 130A, while in such first rotary position (FIG. 4A), channel 190 of alternate rotary valve 108A is displaced 180 degrees from first rotary position.

Operation of this alternate embodiment is generally similar to operation of the preferred embodiment described above. In the alternate embodiment, alternate rotary valve 108A is rotated from first rotary position to second rotary position by manually grasping flat sides 202 and rotating alternate rotary valve 108A (in the preferred embodiment, 180 degrees) to such second rotary position, whereby channel 190 of alternate rotary valve 108A is coaxial to boss 130A. Alternate end extension 170A of extraction cylinder 150A is inserted into taper 196 of channel 190 of alternate rotary valve 108A. Liquid contents of container 20A are extracted in the same basic manner as described above for the preferred embodiment. Extraction assembly 40 is removed from adapter assembly 30 and alternate rotary valve 108A is rotated back to first rotary position.

The above-described invention has a number of particular features which should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. An apparatus for extracting and transferring fluid from a container having an opening comprising:
   a. a syringe comprising:
      (i) a substantially hollow body having an internal chamber and upper and lower ends;
      (ii) a plunger, slidably disposed within said internal chamber of said body;
      (iii) a nose member disposed at the lower end of said body, wherein said nose member has at least one flat side, and a bore extending through said nose member into said internal chamber of said body; and
      (iv) a boss extending radially outward from said nose member;
   b. an adapter cap adapted to be disposed on the opening of said container comprising:
      (i) a substantially cylindrical recess having a helical groove disposed along the inner surface of said substantially cylindrical recess; and
      (ii) a bore extending from the base of said recess through said adapter cap;
   c. a elastomeric valve member having a bore, wherein said bore has at least one flat surface, said elastomeric valve member is rotatably disposed within the substantially cylindrical recess of said adapter cap and biased against the base of said substantially cylindrical recess of said adapter cap, and said bore is offset from the center of said valve member; and
   d. a siphon tube having a bore, extending from said adapter cap into said container.

2. The apparatus of claim 1, wherein said adapter cap is threadably connected to said container.

3. The apparatus of claim 1, wherein said substantially hollow body of said syringe has at least one flat surface along the length of said body.

* * * * *